United States Patent

[11] 3,596,173

[72] Inventor Arthur M. Cohen
    Westport, Conn.
[21] Appl. No 2,993
[22] Filed Jan. 15, 1970
[45] Patented July 27, 1971
[73] Assignee Electric Regulator Corporation
    Norwalk, Conn.

[54] POSITION SENSING SYSTEM EFFECTIVE TO PRODUCE AN OUTPUT SIGNAL AS FUNCTION OF INDUCTANCE
9 Claims, 3 Drawing Figs.

[52] U.S. Cl. .................................................. 323/90,
                                                        336/92
[51] Int. Cl. ...................................................... H05,
                                                        H01f 27/06
[50] Field of Search ............................................ 323/51, 90;
                           317/DIG. 2; 340/266, 280, 282

[56] References Cited
UNITED STATES PATENTS
2,972,071  2/1961  Leonard  323/90 X
3,032,705  5/1962  Olsen    323/90 X Primary Examiner—Lee T. Hix
Attorney—James and Franklin ABSTRACT: A sensing or control system, effective to sense the position of a mechanical element and produce an electrical signal in accordance with said position, includes a magnetic member adapted to be moved in response to the movement of the mechanical element into magnetic engagement with a magnetic core received within and extending from an induction coil, thereby to change the inductance of said coil. The signal producing means comprises an electrical circuit incorporating said inductance coil and effective to compare a voltage responsive to the inductance of said coil with a reference voltage and calibrated to null the signal at a desired position of said mechanical element.

PATENTED JUL27 1971
3,596,173
FIG. 1
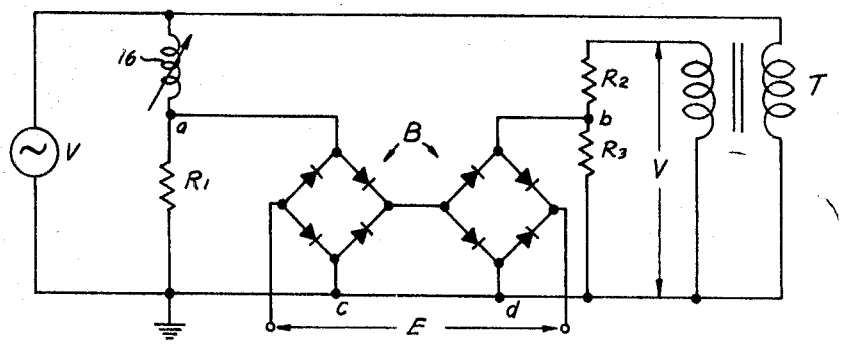
FIG. 2
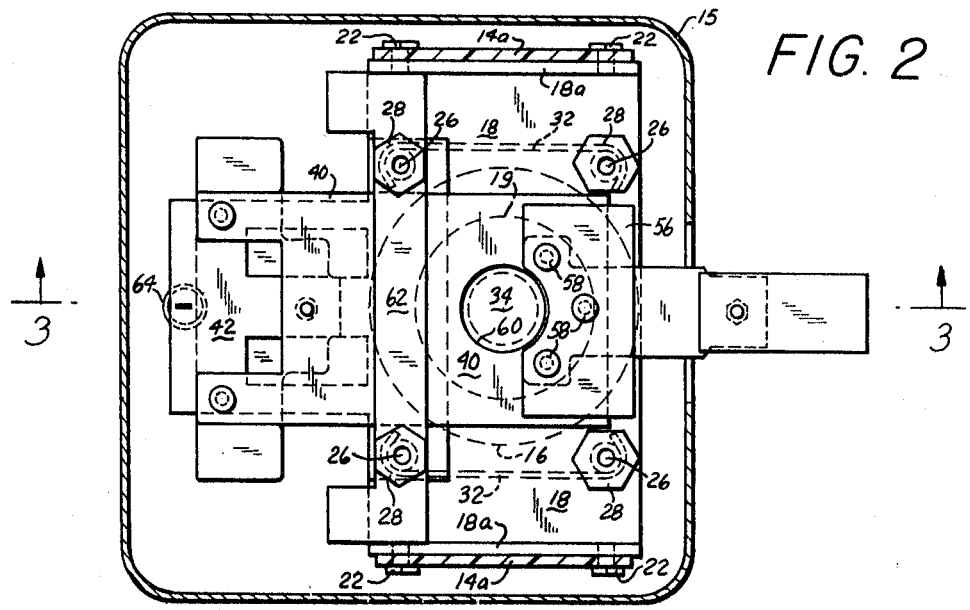
FIG. 3
INVENTOR
ARTHUR M. COHEN
BY James aut Franklin
ATTORNEY

POSITION SENSING SYSTEM EFFECTIVE TO PRODUCE AN OUTPUT SIGNAL AS FUNCTION OF INDUCTANCE

The present invention relates to a system for sensing the position of a mechanical element and producing an output signal in accordance with such position. Devices for converting mechanical position into an electrical signal, often referred to as transducers, are commonly employed in control systems for the purpose of controlling the position of a mechanical element. In control systems of this type the signal generated in response to the position of a mechanical element is generally applied to a control instrumentality in order to produce the desired result, usually to maintain said element in a particular position. Sensing systems of this type have taken many forms in the past. A common form of this device utilizes the electrical contact of a member or members adapted in response to the movement of the controlled element, to move along a resistor to thereby vary the resistance of the latter. An electrical signal is produced which is responsive to such change in resistance.

Many problems arise in the design and use of systems and devices of this character. Sensitivity is always an important factor. The power handling capacity of the device is another important factor usually antithetical to sensitivity. If large amounts of power are to be handled directly by the device itself, it must be so constructed as to be inherently relatively insensitive. Closely related to sensitivity is the property of continuity. Thus, a sequence of electrical contacts by a moving member with a resistor will produce a stepped output signal in response to such movement. The sensitivity of the device can obviously be no better than the electrical magnitude of the step. Reliability and dependability are factors which are also related to sensitivity and power handling capacity. In general, the more sensitive the device and the more power it must directly handle, the shorter is it's operating life and the more susceptible it is to improper operation. A further aspect of sensitivity relates to the magnitude of force which must be exerted on the mechanically moved element in order to give rise to a change in the control electrical characteristic. Again, this is related to the particular type of electrical contact utilized.

The usual form of rheostat, or variable resistor, comprises a resistance wire helically wound about a supporting form, a brush being slidable along the form so as to make contact with different portions of the winding. With a device of this type uniform or continuous variations of resistance is not feasible since the movement of the brush from one operative position to its next adjacent operative position involves the connection to, or disconnection from, the circuit of a predetermined length of resistance wire having its own inherent resistance. Moreover, the overall electrical characteristics of devices of this type are dependent upon the electrical connection between the brush and winding. These elements are particularly sensitive to wear, to the deleterious effect of dust and dirt, to oxidizing and pitting of the brush and to the amount of power which is directly handled by the device.

Another type of mechanico-electrical transducer comprises a plurality of electrical contact pairs adapted to be sequentially opened and closed in accordance with the movement of a control element. With a device of this type, the disadvantages inherent in the use of a sliding brush are not present but the electrical output of the device again can be varied only in a distinctly stepwise manner so that its sensitivity leaves much to be desired. A comparatively recent development is the brushless mechanical-electrical transducer, disclosed in my U. S. Pat. No. 3,057,979, which eliminates, to some extent, the disadvantage of the prior art structures mentioned above. This was achieved by modifying the mode of actuation of a contact- control member to cause continuous sequential opening and closing of a plurality of pairs of electrical contacts. This is accomplished by superimposing a dither action upon the mechanical positioning of the contact-control member by the external mechanically moving element. As disclosed in the aforementioned patent, an electromagnetic coil is energized with a suitable alternating current. The electromagnet acts upon a magnetizable element which is operatively connected to said contact-controlling member. The dither is sufficient to cause the member to vibrate so as to open and close a given contact pair while the external mechanically moving element remains in a given position. Said given position determines the length of time a given contact pair will be open or closed, thus defining a value of resistance somewhere intermediate the values defined by a steady state open or closed position of said given contact pair. The result is a relatively smooth, accurate output signal sensitive to small changes in the position of the mechanically moving external element. However, because the device utilizes electrical contacts, some of the aforementioned problems of wear, dust and dirt, oxidizing, and pitting remain, at least to some extent, with regard to the contact member. Indeed, the problem of wear becomes even more acute where the contact member opens and closes 120 times per second (in response to a 60 c.p.s. current applied to the coil) as does the member to which the dither is applied in my aforementioned patent.

By contrast, the sensing system of the present invention eliminates completely the problems associated with electrical contact apparatus by utilizing the effect of a change of an electromagnetic field on the inductance of an induction coil. The resulting change in inductance is utilized as the controlling electrical property.

It is therefore a primary object of the present invention to provide a sensing device adapted to vary an electrical property in response to the position of a moving mechanical element and which is continuously sensitive to small changes in said position.

It is another object of the present invention to devise an electrical circuit adapted to produce an output signal which accurately reflects the value of such electrical property notwithstanding variations in the source voltage applied thereto.

To the accomplishment of the above, the device of the present invention comprises an inductance coil at least partially surrounded by magnetic forming a magnetic circuit for the flux lines generated by said coil. A gap is provided in the magnetic circuit and a magnetizable element adapted to move in response to movement of an external mechanical element is positioned with respect to the coil and the magnetic circuit so as to progressively increase or reduce the gap in response to such movement in one direction or the other. The induction coil is operatively connected to an electrical circuit effective to compare the voltage across the coil to a reference voltage.

To the accomplishment of the above, and to such other objects as may hereinafter appear, the present invention relates to a sensing system as defined in the accompanying claims and as described in this specification, taken together with the accompanying drawing, in which:

FIG. 1 is a circuit diagram of a circuit for producing a signal as a function of the inductance of a variable inductor.

FIG. 2 is a cross-sectional top plan view taken along line 2–2 of FIG. 3, showing the sensing device of the present invention.

FIG. 3 is a cross-sectional side elevation taken along line 3–3 of FIG. 2, showing the sensing device of the present invention with the movable bridge member in its spring-biased position.

As best shown in FIG. 3, the sensing device is mounted on a support 10 to which a frame member 14 is attached by suitable means 12. A housing 15 is adapted to fit onto frame 14 along peripheral grooves 17. Frame member 14 includes a pair of extension members 14a extending downwardly from support 10 and adapted to support the structure hereinafter described. The device proper of the present invention comprises an induction coil 16 on either end of which are end plates 18 and 20 respectively. As best shown in FIG. 2, end plate 18 has an aperture 19 of a smaller diameter than coil 16 and centered on the axis thereof. Plate 18 further includes upstanding portions 18a which are connected by suitable means 22 to frame member 14a (FIG. 3). End plate 20 extends substantially beyond the periphery of induction coil 16 and is connected to housing 15 by a bolt and nut arrangement generally designated 24. End plates 18 and 20 are connected together and thus each clamped tightly against opposite ends of coil 16 by posts 26 and fasteners 28 and 30 respectively. Magnetic spacer members in the form of plates 32 with rectangular cutouts 35 are mounted on posts 26 as by being bent onto such posts (FIG. 2) and serve as a magnetic connection between end plates 18 and 20. A magnetic core 34 is positioned within coil 16 and is secured at one end of end plate 20 by bolt 36. The other end of core 34 extends outwardly from coil 16 and is received within and extends through aperture 19 of end plate 18. Coil 34 is anchored firmly in position relative to end plate 18 by means of a washer 38 of nonmagnetic material. It will now be readily apparent that coil 16 is firmly secured on a framework defining a magnetic circuit consisting of magnetic core 34, magnetic end plates 18 and 20 and magnetic spacer means 32, washer 38 providing the sole gap in the otherwise closed magnetic circuit.

The moveable portion of my device is again best illustrated in FIG. 3. A bridge member 40 is pivotally mounted on end plate 18 by means of a thin resilient strip 42 secured to end plate 18 at one end and secured between bridge member 40 and a support member 46 by bolts 48 at its other end. An arm 50 adapted to be operatively connected to the mechanical element, the position of which is to be sensed, is secured to bridge member 40 by means of another thin strip 52 of resilient material secured at one end to arm 50 by bolt 54 and secured at its other end between bridge member 40 and support member 56 by bolts 58. Bridge member 40 is provided with an aperture 60 slightly larger than core 34 and adapted to receive and surround said core when bridge member 40 is pivoted to a position parallel to end plate 18. A stop bar 62 is secured on posts 26 above bridge member 40 and serves to prevent bridge member 40 from pivoting in a counterclockwise direction beyond a predetermined position. Bridge member 40 is normally spring biased to this position by tension spring 64 connected between end plate 20 and strip 42. It will be apparent that bridge member 40 is adapted to move between the position illustrated in FIG. 3 (hereinafter referred to as the open position) and a position in which it is flush with end plate 18, but spaced therefrom by the thickness of strip 42 (hereinafter referred to as the closed position). Leads 66 (shown fragmented in FIG. 2) connect the terminals of induction coil 16 to leads mounted on support 10 and extending externally therefrom.

When induction coil 16 is energized an electromagnetic field is established around the coil, as is well known in the art. The resulting magnetic field tends to urge bridge member 40 toward coil 16. However, tension spring 64 is sufficient to maintain bridge member 40 in the position illustrated notwithstanding this slight magnetic pull. The magnetic flux generated by coil 16 passes downwardly through core 34, through end plate 20 and thence through the magnetic spacers to end plate 18. The flux then tends to pass from the interior of aperture 19 in end plate 18 back to core 34. Washer 38, being of nonmagnetic material, acts as a magnetic insulator which inhibits this flow. Most of the flux takes the path of least resistance, jumping the small airgap between plate 18 and bridge member 40 near its pivot point. From there, the flux jumps the airgap between the interior of the aperture 60 in bridge member 40 and the core 34. Since the effective airgap (e.g., the combination of the above two gaps) is smaller than the gap provided by washer 38, bridge member 40 serves as a bridge between end plate 18 and core 34 by providing the path of least resistance for the magnetic flux lines generated by coil 16. As bridge member 40 pivots in a clockwise direction as viewed in FIG. 3, the flux distribution will change because of the greater proximity of the bridge member 40 to core 34 (at the interior of aperture 60) and end plate 18 (at its bottom surface), the greatest change in proximity occurring at its extreme right-hand end. It should be noted that bridge member 40 never provides a completely closed magnetic circuit for the electromagnetic field generated by coil 16. In the lowermost position of arm 50, bridge member 40 is spaced from end plate 18 by a gap corresponding to the thickness of strip 42 of the order of 0.01 inches and from core 34 by a gap between said core and the interior of aperture 60, also of the order of 0.01 inches. Further downward movement of arm 50 will produce a flexing of strip 52 without materially reducing the gap between bridge member 40 and end plate 18. As a result of the change in flux distribution brought about by movement of bridge member 40, the inductance of coil 16 changes, inductance being a function of the permeability of the material surrounding the coil. This change in inductance may be utilized to produce an electrical signal as a function of the movement of arm 50.

A circuit for producing such a signal is illustrated in FIG. 1. Coil 16, illustrated schematically as a variable inductor, is placed in series with a resistor $R_1$, across an alternating voltage source V. The primary winding of a transformer T is connected in parallel with inductor 16 and resistor $R_1$ across the same voltage source. Transformer T has a turns ratio of one to one and thus the voltage taken off the secondary winding is equal in magnitude to the voltage source V. A pair of resistors $R_2$ and $R_3$ are connected across the terminals of the secondary winding of transformer T to form a closed current loop. The voltage across $R_1$ is compared with the voltage across $R_3$ by picking the voltage off node $a$ (between inductor 16 and resistor $R_1$) and node $b$ (between resistors $R_2$ and $R_3$) and connecting said picked off voltages as inputs to a pair of full wave bridge rectifiers, generally designated B, the other inputs being connected to ground at nodes $c$ and $d$. An output signed E across the output terminals of full wave bridge rectifiers B is used for control purposes, e.g., to control the position of the mechanical element connected to arm 50. It will be apparent that the voltage across resistor $R_1$, picked off at node $a$, will be equal to the source voltage V minus the voltage across the coil 16, which voltage will vary as the inductance of coil 16 varies. The voltage across $R_3$, picked off at node $b$, will be directly proportional to the source voltage V [namely, $R_3/(R_2+R_3)$ V].

It will be apparent that the output signal E measures the voltage across coil 16 against a reference voltage. Since both voltages are responsive to the same voltage source V, the output signal E will be insensitive to line variations in the voltage source. The values of the three resistors $R_1$, $R_2$ and $R_3$ may, of course, be chosen so as to null output signal E at any desired value of the voltage across coil 16, corresponding to a given position of bridge member 40 and thus, through arm 50, a given position of the mechanical element in question. The output signal may be used either to monitor or control the position of such mechanical element.

An example of a control system in which the present invention has been found particularly useful is the control of thread tension in thread winding systems. In such a system arm 50 is operatively connected to a slack roller resting on a slack loop joined between a set of support rollers. As the slack is increased or decreased beyond its desired value, the slack roller changes position, thereby causing bridge member 40 to pivot. The resulting change of inductance is sensed by the circuit of FIG. 1 and the output signal is applied to an electric motor which in turn controls the rate feed of the thread. The circuit resistors are chosen so as to null the signal at the desired position of the slack roller. The electric motor is either speeded up or slowed down depending upon the sign of the output signal which in turn depends on whether the inductance of coil 16 is increased or decreased beyond the nulling point.

The sensing system of the present invention provides a means of quickly and accurately sensing the position of a mechanical element and producing an output signal in accordance with such position. Because the apparatus utilizes no electrical contact members, the response encounters none of the disturbances inherent in the making and breaking of electrical contacts. Mechanical movement is converted smoothly and accurately into an electrical signal by virtue of variations in the intensity of magnetic field. The control signal generated by the circuit herein disclosed likewise accurately reflects the sensed position free from line variations in the external voltage source utilized.

While only a single embodiment of this invention has been herein specifically disclosed, it will be apparent that variations may be made thereto without departing from the spirit and scope of the invention as defined in the appended claims.

I claim:

1. A sensing or control system for sensing the position of a mechanical element and producing an output signal as a function of said position, comprising an inductor mounted on a frame and having a core of magnetic material positioned therein and extending from one end of said inductor, a member adapted to be operatively connected to said mechanical element and movable therewith, said member being provided with an aperture adapted to receive the extended portion of said magnetic core and constructed, at least in the vicinity of said aperture, of magnetic material, said member positioned in relation to said core such that upon relative movement of said member, said member moves toward said inductor and said aperture moves toward a position surrounding and receiving said core, thereby changing the inductance of said inductor, and an electrical circuit operatively connected to said inductor and effective to produce an output signal as a function of the inductance of said inductor.

2. The sensing system of claim 1, further comprising a magnetic spacer adjacent to, but spaced from said inductor and effective to capture the magnetic flux emanating from said extended end of said magnetic core and direct it back to the other end of said core in a complete magnetic circuit and wherein said member, upon being moved toward said inductor, is effective to capture said magnetic flux and direct it from said core to said spacer, thereby reducing the effective airgap between the extended end of said core and said spacer, whereby the inductance of said inductor is changed.

3. The sensing system of claim 1, wherein said member is pivotally connected to said frame along an axis on one side of said aperture whereby, upon movement of said mechanical element, said member pivots on said frame.

4. The sensing system of claim 3, wherein said pivot axis is in substantially the same plane as said one end of said inductor, whereby said member is adapted to pivot from a position inclined to the plane of said one end of said inductor to a position parallel to the plane of said one end of said inductor and contiguous thereto.

5. The sensing system of claim 4, wherein said member is connected to said element on one side of said pivot axis and is connected on the other side of said pivot axis to a resilient member effective to bias said member away from said inductor.

6. A sensing system for sensing the position of a mechanical element and producing an output signal as a function of said position, comprising a frame, an induction coil mounted on said frame and adapted, when actuated by an electrical current passed therethrough, to develop an electromagnetic field, a magnetic core positioned within said induction coil and extending therefrom at least at one end thereof, a first magnetic end plate having an aperture therein and positioned at said one end of said coil such that said aperture surrounds and is spaced from the extended portion of said magnetic core, a second magnetic end plate positioned at the other end of said magnetic coil and operatively magnetically connected to said core, magnetic spacer means spaced from said coil and operatively magnetically connecting said first and second magnetic end plates, whereby when said bridge member is in said first position, the magnetic flux lines of said electromagnetic field are adapted to flow in a circuital field successively through said core, said second end plate, said spacer means, said first end plate, across said space to said bridge member and thence across a gap defined between said bridge aperture and said core, back to said core, and a magnetic bridge member operatively connected to said mechanical element and movable therewith, said bridge member having an aperture smaller than said first end plate aperture, but larger than said core and being pivotally mounted on said frame, said bridge member adapted to move from a first position at said one end of said coil spaced from said first end plate to a position substantially contiguous to said first end plate with said bridge aperture receiving and surrounding said extended portion of said core, whereby upon relative movement of said mechanical element said bridge member pivots on said frame, with said aperture moving toward said second position, to capture said flux lines thereby tending to reduce said space and said gap to change the inductance of said induction coil, and an electrical circuit operatively connected to said induction coil.

7. The sensing system of claim 1, wherein said electrical circuit comprises a resistor and means for producing a reference voltage, said inductor being connected in series with said resistor, said signal producing means comprising means to compare the voltage across said resistor with said reference voltage.

8. The sensing system of claim 7, wherein said reference voltage is responsive to the voltage applied across said resistor and said inductor.

9. The sensing system of claim 8 comprising transformer means connected in parallel with said inductor and said resistor.